(12) United States Patent
Tang et al.

(10) Patent No.: US 11,796,042 B2
(45) Date of Patent: Oct. 24, 2023

(54) CONTINUOUSLY VARIABLE TRANSMISSION

(71) Applicant: WEIHAI TUANZHONG TRANSMISSION CO., LTD., Weihai (CN)

(72) Inventors: Yongfeng Tang, Weihai (CN); Yuning Tang, Weihai (CN)

(73) Assignee: WEIHAI TUANZHONG TRANSMISSION CO., LTD., Weihai (CN)

( * ) Notice: Subject to any disclaimer, the term of this patent is extended or adjusted under 35 U.S.C. 154(b) by 211 days.

(21) Appl. No.: 17/430,618

(22) PCT Filed: Feb. 5, 2020

(86) PCT No.: PCT/CN2020/074340
§ 371 (c)(1),
(2) Date: Aug. 12, 2021

(87) PCT Pub. No.: WO2020/168910
PCT Pub. Date: Aug. 27, 2020

(65) Prior Publication Data
US 2022/0107017 A1      Apr. 7, 2022

(30) Foreign Application Priority Data
Feb. 21, 2019   (CN) .......................... 201910128090.5

(51) Int. Cl.
*F16H 47/12*      (2006.01)
(52) U.S. Cl.
CPC .................................. *F16H 47/12* (2013.01)

(58) Field of Classification Search
CPC .................................. F16H 47/12; F16H 33/16
See application file for complete search history.

(56) References Cited

U.S. PATENT DOCUMENTS

| | | | |
|---|---|---|---|
| 1,933,143 A * | 10/1933 | Janssen | F16H 33/16 475/112 |
| 2,293,547 A * | 8/1942 | Hobbs | F16H 47/12 475/111 |
| 4,513,636 A | 4/1985 | Harada | |

(Continued)

FOREIGN PATENT DOCUMENTS

| | | |
|---|---|---|
| CH | 615004 A5 * | 12/1979 |
| GB | 235291 A * | 6/1925 |

OTHER PUBLICATIONS

ISR of the counterpart PCT application No. PCT/CN2020/074340 by ISA/CN dated Mar. 27, 2020.

*Primary Examiner* — Erin D Bishop
(74) *Attorney, Agent, or Firm* — Platinum Intellectual Property PC

(57) ABSTRACT

A continuously variable transmission, provided with a continuously variable transmission provided with an outer housing, an intermediate housing is provided in the middle of the outer housing, a first end cover and a second end cover are respectively provided on both sides of the intermediate housing, the inside of the intermediate housing is a cavity structure, and the cavity inside the intermediate housing and insides of the first end cover and the second end cover form an inner cavity. The described continuously variable transmission may be widely used in the field of transmission.

8 Claims, 6 Drawing Sheets

(56) References Cited

U.S. PATENT DOCUMENTS

| | | |
|---|---|---|
| 10,677,337 B2 * | 6/2020 | Tang ....................... F16H 47/12 |
| 11,603,914 B2 * | 3/2023 | Tang ....................... F16H 47/12 |
| 2006/0128514 A1 | 6/2006 | Glockler |

* cited by examiner

CONTINUOUSLY VARIABLE TRANSMISSION

RELATED APPLICATIONS

This application is a United States National Stage Application filed under 35 U.S.C 371 of PCT Patent Application Serial No. PCT/CN2020/074340, filed Feb. 5, 2020, which claims Chinese Patent Application Serial No. CN 201910128090.5, filed Feb. 21, 2019, the disclosure of all of which are hereby incorporated by reference in their entirety.

BACKGROUND OF THE INVENTION

Field of the Invention

The present invention relates to a mechanical transmission apparatus, and in particularly to a continuously variable transmission.

Description of the Related Art

An existing continuously variable transmission is provided with an outer housing, an intermediate housing is provided in the middle of the outer housing, a first end cover and a second end cover are respectively provided on both sides of the intermediate housing, the inside of the intermediate housing is a cavity structure, and the cavity inside the intermediate housing and insides of the first end cover and the second end cover form an inner cavity; a first shaft penetrates in the middle of the first end cover, the first shaft is rotatably connected to the first end cover, a first sun gear is fixedly provided on the first shaft, the first sun gear is located inside the first end cover, the first sun gear is adjacently provided with a first support frame, the first shaft passes through the first support frame, and the first shaft is rotatably connected to the first support frame; a first planet gear is provided on an outer circumference of the first sun gear, the first planet gear is engaged with the first sun gear, and the first planet gear and the first sun gear constitute a first planet gear set; a second shaft penetrates in the middle of the second end cover, the second shaft is rotatably connected to the second end cover, a second sun gear is fixedly provided on the second shaft, the second sun gear is located inside the second end cover, the second sun gear is adjacently provided with a second support frame, a second planet gear is provided on an outer circumference of the second sun gear, the second planet gear is engaged with the second sun gear, and the second planet gear and the second sun gear constitute a second planet gear set; a bucket wheel sun gear is fixedly provided on the first shaft passing through the first support frame, the bucket wheel sun gear is located inside the first support frame, a bucket wheel planet gear is provided on an outer circumference of the bucket wheel sun gear, the bucket wheel planet gear is engaged with the bucket wheel sun gear, and the bucket wheel planet gear and the bucket wheel sun gear constitute a bucket wheel planet gear set; the bucket wheel sun gear is adjacently provided with a third support frame; a bucket wheel planet gear shaft is fixedly provided in the middle of the bucket wheel planet gear, the inside of the bucket wheel planet gear shaft is a hollow structure, the bucket wheel planet gear shaft passes through the third support frame, the bucket wheel planet gear shaft is rotatably connected to the third support frame, a bucket wheel is fixedly provided on the bucket wheel planet gear shaft passing through the third support frame, the bucket wheel is located between the second support frame and the third support frame, and the bucket wheels fixedly provided on a plurality of the bucket wheel planet gear shafts constitute a bucket wheel set; a planet gear shaft is fixedly provided in the middle of the first planet gear, the planet gear shaft passes through the first support frame, the hollow bucket wheel planet gear shaft and the second support frame, the planet gear shaft is rotatably connected to the first support frame and the second support frame respectively, and the planet gear shaft passing through the first support frame, the hollow bucket wheel planet gear shaft and the second support frame is fixedly connected to the second planet gear.

The disadvantage of this continuously variable transmission structure is as follows. Since the bucket wheel sun gear and the first sun gear are rigidly connected to the first shaft, when the first shaft of the continuously variable transmission is used as an input end, a torque that provides rotation of the bucket wheel comes from the first shaft, the rotation of the bucket wheel distributes a part of the input torque of the first shaft, and under the working condition that the torque provided by the first shaft is insufficient, the output torque will be even more insufficient; when the second shaft of the continuously variable transmission is used as the input end, a torque that provides rotation of the bucket wheel comes from the first shaft, the rotation of the bucket wheel increases the resistance torque of the first shaft, and under the working condition that the torque provided by the second shaft is insufficient, the output torque will be even more insufficient. The continuously variable transmission cannot realize increased functions and satisfy more working conditions.

SUMMARY OF THE INVENTION

The present invention is to solve the technical problem that, when the first shaft of the continuously variable transmission is used as an input end, a torque that provides rotation of the bucket wheel comes from the first shaft, the rotation of the bucket wheel distributes a part of the input torque of the first shaft, and under the working condition that the torque provided by the first shaft is insufficient, the output torque will be even more insufficient; when the second shaft of the continuously variable transmission is used as the input end, a torque that provides rotation of the bucket wheel comes from the first shaft, the rotation of the bucket wheel increases the resistance torque of the first shaft, and under the working condition that the torque provided by the second shaft is insufficient, the output torque will be even more insufficient. The present invention provides a continuously variable transmission which has multiple functions and satisfies different working conditions, wherein four control ends are formed by an outer housing, a first shaft, a second shaft and a third shaft.

To this end, the technical solution of the present invention is a continuously variable transmission provided with an outer housing, an intermediate housing is provided in the middle of the outer housing, a first end cover and a second end cover are respectively provided on both sides of the intermediate housing, the inside of the intermediate housing is a cavity structure, and the cavity inside the intermediate housing and insides of the first end cover and the second end cover form an inner cavity; a first shaft penetrates in the middle of the first end cover, the inside of the first shaft is a hollow structure, the first shaft is rotatably connected to the first end cover, a first sun gear is fixedly provided on the first shaft, the first sun gear is located inside the first end cover, the first sun gear is adjacently provided with a first support frame, a first planet gear is provided on an outer circumference of the first sun gear, the first planet gear is engaged with the first sun gear, and the first planet gear and the first sun gear constitute a first planet gear set; a second shaft penetrates in the middle of the second end cover, the second shaft is rotatably connected to the second end cover, a second sun gear is fixedly provided on the second shaft, the second sun gear is located inside the second end cover, the second sun gear is adjacently provided with a second support frame, a second planet gear is provided on an outer circumference of the second sun gear, the second planet gear is engaged with the second sun gear, and the second planet gear and the second sun gear constitute a second planet gear set; a bucket wheel sun gear is provided inside the first support frame, a third support frame is adjacently provided inside the bucket wheel sun gear, a bucket wheel planet gear is provided on an outer circumference of the bucket wheel sun gear, the bucket wheel planet gear is engaged with the bucket wheel sun gear, and the bucket wheel planet gear and the bucket wheel sun gear constitute a bucket wheel planet gear set; a bucket wheel planet gear shaft is fixedly provided in the middle of the bucket wheel planet gear, the inside of the bucket wheel planet gear shaft is a hollow structure, the bucket wheel planet gear shaft passes through the third support frame, the bucket wheel planet gear shaft is rotatably connected to the third support frame, a bucket wheel is fixedly provided on the bucket wheel planet gear shaft passing through the third support frame, the bucket wheel is located between the second support frame and the third support frame, and the bucket wheels fixedly provided on a plurality of the bucket wheel planet gear shafts constitute a bucket wheel set; a third shaft is fixedly provided in the middle of the bucket wheel sun gear, the third shaft penetrates through the first support frame and the first shaft whose inside is a hollow structure, and the third shaft is rotatably connected to the first support frame; a planet gear shaft is fixedly provided in the middle of the first planet gear, the planet gear shaft passes through the first support frame, the hollow bucket wheel planet gear shaft and the second support frame, the planet gear shaft is rotatably connected to the first support frame and the second support frame respectively, and the planet gear shaft passing through the first support frame, the hollow bucket wheel planet gear shaft and the second support frame is fixedly connected to the second planet gear.

Preferably, a semicircular cavity is provided in a position corresponding to the bucket wheel in an inner wall of the outer housing, and the bucket wheel is located in the semicircular cavity.

Preferably, there are 3 or more first planet gears.

Preferably, there are 3 or more second planet gears.

Preferably, a central bucket wheel is fixedly provided on the second shaft or the third shaft.

A continuously variable transmission is provided with an outer housing, an intermediate housing is provided in the middle of the outer housing, a first end cover and a second end cover are respectively provided on both sides of the intermediate housing, the inside of the intermediate housing is a cavity structure, and the cavity inside the intermediate housing and insides of the first end cover and the second end cover form an inner cavity; a first shaft penetrates in the middle of the first end cover, the inside of the first shaft is a hollow structure, the first shaft is rotatably connected to the first end cover, a first gear ring is fixedly provided on the first shaft, the first gear ring is located inside the first end cover, the first gear ring is adjacently provided with a first support frame, a first planet gear is provided inside an outer circumference of the first gear ring, the first planet gear is engaged with the first gear ring, and the first planet gear and the first gear ring constitute a first planet gear set; a second shaft penetrates in the middle of the second end cover, the second shaft is rotatably connected to the second end cover, a second gear ring is fixedly provided on the second shaft, the second gear ring is located inside the second end cover, the second gear ring is adjacently provided with a second support frame, a second planet gear is provided inside an outer circumference of the second gear ring, the second planet gear is engaged with the second gear ring, and the second planet gear and the second gear ring constitute a second planet gear set; a bucket wheel sun gear is provided inside the first support frame, a third support frame is adjacently provided inside the bucket wheel sun gear, a bucket wheel planet gear is provided on an outer circumference of the bucket wheel sun gear, the bucket wheel planet gear is engaged with the bucket wheel sun gear, and the bucket wheel planet gear and the bucket wheel sun gear constitute a bucket wheel planet gear set; a bucket wheel planet gear shaft is fixedly provided in the middle of the bucket wheel planet gear, the inside of the bucket wheel planet gear shaft is a hollow structure, the bucket wheel planet gear shaft passes through the third support frame, the bucket wheel planet gear shaft is rotatably connected to the third support frame, a bucket wheel is fixedly provided on the bucket wheel planet gear shaft passing through the third support frame, the bucket wheel is located between the second support frame and the third support frame, and the bucket wheels fixedly provided on a plurality of the bucket wheel planet gear shafts constitute a bucket wheel set; a third shaft is fixedly provided in the middle of the bucket wheel sun gear, the third shaft penetrates through the first support frame and the first shaft whose inside is a hollow structure, and the third shaft is rotatably connected to the first support frame; a planet gear shaft is fixedly provided in the middle of the first planet gear, the planet gear shaft passes through the first support frame, the hollow bucket wheel planet gear shaft and the second support frame, the planet gear shaft is rotatably connected to the first support frame and the second support frame respectively, and the planet gear shaft passing through the first support frame, the hollow bucket wheel planet gear shaft and the second support frame is fixedly connected to the second planet gear.

A continuously variable transmission is provided with an outer housing, an intermediate housing is provided in the middle of the outer housing, a first end cover and a second end cover are respectively provided on both sides of the intermediate housing, the inside of the intermediate housing is a cavity structure, and the cavity inside the intermediate housing and insides of the first end cover and the second end cover form an inner cavity; a first shaft penetrates in the middle of the first end cover, the inside of the first shaft is a hollow structure, the first shaft is rotatably connected to the first end cover, a first sun gear is fixedly provided on the first shaft, the first sun gear is located inside the first end cover, the first sun gear is adjacently provided with a first support frame, a first planet gear is provided on an outer circumference of the first sun gear, the first planet gear is engaged with the first sun gear, and the first planet gear and the first sun gear constitute a first planet gear set; a second shaft penetrates in the middle of the second end cover, the second shaft is rotatably connected to the second end cover, a second gear ring is fixedly provided on the second shaft, the second gear ring is located inside the second end cover, the second gear ring is adjacently provided with a second support frame, a second planet gear is provided inside an outer circumference of the second gear ring, the second planet gear is engaged with the second gear ring, and the second planet gear and the second gear ring constitute a second planet gear set; a bucket wheel sun gear is provided inside the first support frame, a third support frame is adjacently provided inside the bucket wheel sun gear, a bucket wheel planet gear is provided on an outer circumference of the bucket wheel sun gear, the bucket wheel planet gear is engaged with the bucket wheel sun gear, and the bucket wheel planet gear and the bucket wheel sun gear constitute a bucket wheel planet gear set; a bucket wheel planet gear shaft is fixedly provided in the middle of the bucket wheel planet gear, the inside of the bucket wheel planet gear shaft is a hollow structure, the bucket wheel planet gear shaft passes through the third support frame, the bucket wheel planet gear shaft is rotatably connected to the third support frame, a bucket wheel is fixedly provided on the bucket wheel planet gear shaft passing through the third support frame, the bucket wheel is located between the second support frame and the third support frame, and the bucket wheels fixedly provided on a plurality of the bucket wheel planet gear shafts constitute a bucket wheel set; a third shaft is fixedly provided in the middle of the bucket wheel sun gear, the third shaft penetrates through the first support frame and the first shaft whose inside is a hollow structure, and the third shaft is rotatably connected to the first support frame; a planet gear shaft is fixedly provided in the middle of the first planet gear, the planet gear shaft passes through the first support frame, the hollow bucket wheel planet gear shaft and the second support frame, the planet gear shaft is rotatably connected to the first support frame and the second support frame respectively, and the planet gear shaft passing through the first support frame, the hollow bucket wheel planet gear shaft and the second support frame is fixedly connected to the second planet gear.

A continuously variable transmission is provided with an outer housing, an intermediate housing is provided in the middle of the outer housing, a first end cover and a second end cover are respectively provided on both sides of the intermediate housing, the inside of the intermediate housing is a cavity structure, and the cavity inside the intermediate housing and insides of the first end cover and the second end cover form an inner cavity; a first shaft penetrates in the middle of the first end cover, the inside of the first shaft is a hollow structure, the first shaft is rotatably connected to the first end cover, a first gear ring is fixedly provided on the first shaft, the first gear ring is located inside the first end cover, the first gear ring is adjacently provided with a first support frame, a first planet gear is provided inside an outer circumference of the first gear ring, the first planet gear is engaged with the first gear ring, and the first planet gear and the first gear ring constitute a first planet gear set; a second shaft penetrates in the middle of the second end cover, the second shaft is rotatably connected to the second end cover, a second sun gear is fixedly provided on the second shaft, the second sun gear is located inside the second end cover, the second sun gear is adjacently provided with a second support frame, a second planet gear is provided on an outer circumference of the second sun gear, the second planet gear is engaged with the second sun gear, and the second planet gear and the second sun gear constitute a second planet gear set; a bucket wheel sun gear is provided inside the first support frame, a third support frame is adjacently provided inside the bucket wheel sun gear, a bucket wheel planet gear is provided on an outer circumference of the bucket wheel sun gear, the bucket wheel planet gear is engaged with the bucket wheel sun gear, and the bucket wheel planet gear and the bucket wheel sun gear constitute a bucket wheel planet gear set; a bucket wheel planet gear shaft is fixedly provided in the middle of the bucket wheel planet gear, the inside of the bucket wheel planet gear shaft is a hollow structure, the bucket wheel planet gear shaft passes through the third support frame, the bucket wheel planet gear shaft is rotatably connected to the third support frame, a bucket wheel is fixedly provided on the bucket wheel planet gear shaft passing through the third support frame, the bucket wheel is located between the second support frame and the third support frame, and the bucket wheels fixedly provided on a plurality of the bucket wheel planet gear shafts constitute a bucket wheel set; a third shaft is fixedly provided in the middle of the bucket wheel sun gear, the third shaft penetrates through the first support frame and the first shaft whose inside is a hollow structure, and the third shaft is rotatably connected to the first support frame; a planet gear shaft is fixedly provided in the middle of the first planet gear, the planet gear shaft passes through the first support frame, the hollow bucket wheel planet gear shaft and the second support frame, the planet gear shaft is rotatably connected to the first support frame and the second support frame respectively, and the planet gear shaft passing through the first support frame, the hollow bucket wheel planet gear shaft and the second support frame is fixedly connected to the second planet gear.

Preferably, a semicircular cavity is provided in a position corresponding to the bucket wheel in an inner wall of the outer housing, and the bucket wheel is located in the semicircular cavity.

The benefit effects of the present invention are as follows. A continuously variable transmission is provided with an outer housing, an intermediate housing is provided in the middle of the outer housing, a first end cover and a second end cover are respectively provided on both sides of the intermediate housing, the inside of the intermediate housing is a cavity structure, and the cavity inside the intermediate housing and insides of the first end cover and the second end cover form an inner cavity; a first shaft penetrates in the middle of the first end cover, the inside of the first shaft is a hollow structure, the first shaft is rotatably connected to the first end cover, a first sun gear is fixedly provided on the first shaft, the first sun gear is located inside the first end cover, the first sun gear is adjacently provided with a first support frame, a first planet gear is provided on an outer circumference of the first sun gear, the first planet gear is engaged with the first sun gear, and the first planet gear and the first sun gear constitute a first planet gear set; a second shaft penetrates in the middle of the second end cover, the second shaft is rotatably connected to the second end cover, a second sun gear is fixedly provided on the second shaft, the second sun gear is located inside the second end cover, the second sun gear is adjacently provided with a second support frame, a second planet gear is provided on an outer circumference of the second sun gear, the second planet gear is engaged with the second sun gear, and the second planet gear and the second sun gear constitute a second planet gear set; a bucket wheel sun gear is provided inside the first support frame, a third support frame is adjacently provided inside the bucket wheel sun gear, a bucket wheel planet gear is provided on an outer circumference of the bucket wheel sun gear, the bucket wheel planet gear is engaged with the bucket wheel sun gear, and the bucket wheel planet gear and the bucket wheel sun gear constitute a bucket wheel planet gear set; a bucket wheel planet gear shaft is fixedly provided in the middle of the bucket wheel planet gear, the inside of the bucket wheel planet gear shaft is a hollow structure, the bucket wheel planet gear shaft passes through the third support frame, the bucket wheel planet gear shaft is rotatably connected to the third support frame, a bucket wheel is fixedly provided on the bucket wheel planet gear shaft passing through the third support frame, the bucket wheel is located between the second support frame and the third support frame, and the bucket wheels fixedly provided on a plurality of the bucket wheel planet gear shafts constitute a bucket wheel set; a third shaft is fixedly provided in the middle of the bucket wheel sun gear, the third shaft penetrates through the first support frame and the first shaft whose inside is a hollow structure, and the third shaft is rotatably connected to the first support frame; a planet gear shaft is fixedly provided in the middle of the first planet gear, the planet gear shaft passes through the first support frame, the hollow bucket wheel planet gear shaft and the second support frame, the planet gear shaft is rotatably connected to the first support frame and the second support frame respectively, and the planet gear shaft passing through the first support frame, the hollow bucket wheel planet gear shaft and the second support frame is fixedly connected to the second planet gear. Therefore, when operating, the power of rotation of the bucket wheel comes from the third shaft which can be controlled by an external force, the outer housing, the first shaft, the second shaft and the third shaft can respectively form an input end, an output end and a control end of the continuously variable transmission, and the continuously variable transmission realizes multiple functions and satisfies different working conditions.

Figure 1:
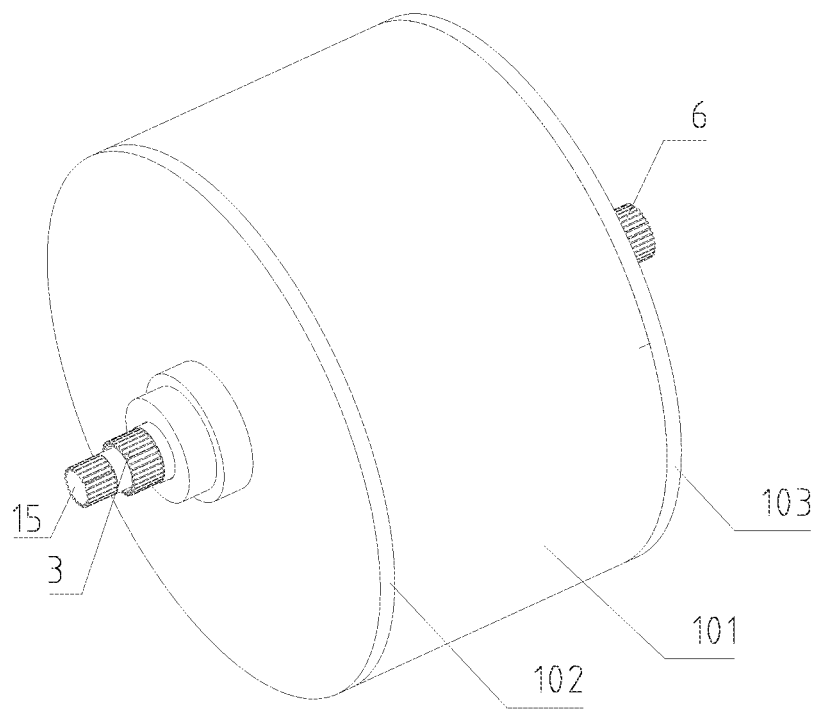
FIG. 1 is an axonometric view of Embodiment 1 of the present invention.
Figure 2:
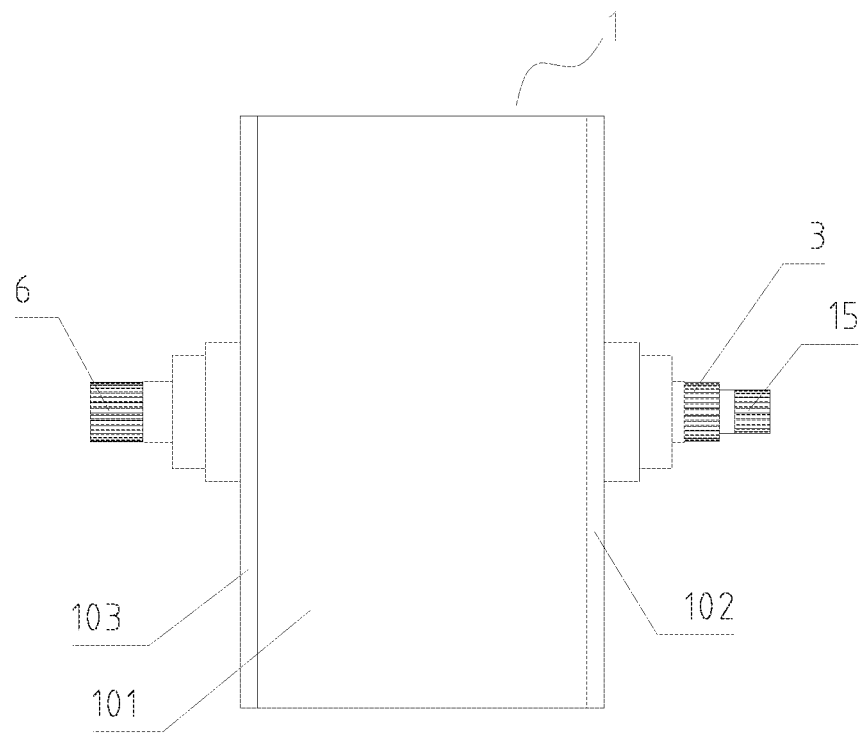
FIG. 2 is a front view of FIG. 1.
Figure 3:
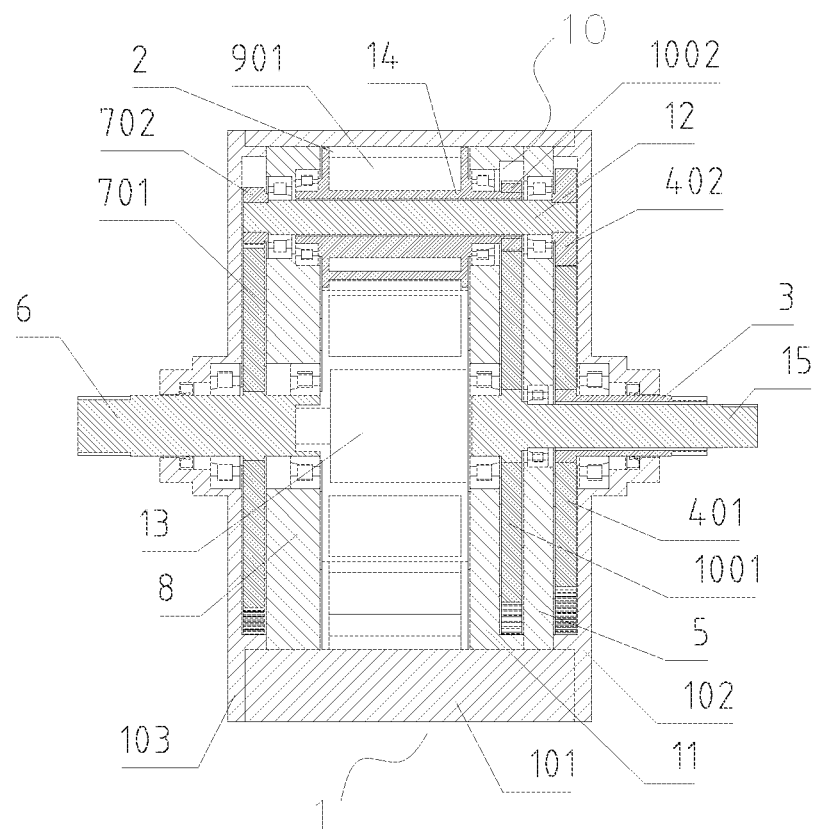
FIG. 3 is a section view of FIG. 1.

SYMBOLS IN THE DRAWINGS 1. outer housing; 101. intermediate housing; 102. first end cover; 103. second end cover; 2. inner cavity; 3. first shaft; 4. first planet gear set; 401. first sun gear; 401A. first gear ring; 402. first planet gear; 5. first support frame; 6. second shaft; 7. second planet gear set; 701. second sun gear; 701A. second gear ring; 702. second planet gear; 8. second support frame; 9. bucket wheel set; 901. bucket wheel; 10. bucket wheel planet gear set; 1001. bucket wheel sun gear; 1002. bucket wheel planet gear; 11. third support frame; 12. planet gear shaft; 13. central bucket wheel; 14. bucket wheel planet gear shaft; 15. third shaft.

DESCRIPTION OF THE EMBODIMENTS

The present invention will be further described below in conjunction with the embodiments.

Embodiment 1

FIGS. 1-6 show an embodiment of a continuously variable transmission of the present invention. The continuously variable transmission is provided with an outer housing 1, an intermediate housing 101 is provided in the middle of the outer housing 1, a first end cover 102 and a second end cover 103 are respectively provided on both sides of the intermediate housing 101, the inside of the intermediate housing 101 is a cavity structure, and the cavity inside the intermediate housing 101 and insides of the first end cover 102 and the second end cover 103 form an inner cavity 2;

a first shaft 3 penetrates in the middle of the first end cover 102, the inside of the first shaft 3 is a hollow structure, the first shaft 3 is rotatably connected to the first end cover 102, a first sun gear 401 is fixedly provided on the first shaft 3, the first sun gear 401 is located inside the first end cover 102, the first sun gear 401 is adjacently provided with a first support frame 5, a first planet gear 402 is provided on an outer circumference of the first sun gear 401, the first planet gear 402 is engaged with the first sun gear 401, and the first planet gear 402 and the first sun gear 401 constitute a first planet gear set 4; a second shaft 6 penetrates in the middle of the second end cover 103, the second shaft 6 is rotatably connected to the second end cover 103, a second sun gear 701 is fixedly provided on the second shaft 6, the second sun gear 701 is located inside the second end cover 103, the second sun gear 701 is adjacently provided with a second support frame 8, a second planet gear 702 is provided on an outer circumference of the second sun gear 701, the second planet gear 702 is engaged with the second sun gear 701, and the second planet gear 702 and the second sun gear 701 constitute a second planet gear set 7; a bucket wheel sun gear 1001 is provided inside the first support frame 5, a third support frame 11 is adjacently provided inside the bucket wheel sun gear 1001, a bucket wheel planet gear 1002 is provided on an outer circumference of the bucket wheel sun gear 1001, the bucket wheel planet gear 1002 is engaged with the bucket wheel sun gear 1001, and the bucket wheel planet gear 1002 and the bucket wheel sun gear 1001 constitute a bucket wheel planet gear set 10; a bucket wheel planet gear shaft 14 is fixedly provided in the middle of the bucket wheel planet gear 1002, the inside of the bucket wheel planet gear shaft 14 is a hollow structure, the bucket wheel planet gear shaft 14 passes through the third support frame 11, the bucket wheel planet gear shaft 14 is rotatably connected to the third support frame 11, a bucket wheel 901 is fixedly provided on the bucket wheel planet gear shaft 14 passing through the third support frame 11, the bucket wheel 901 is located between the second support frame 8 and the third support frame 11, and the bucket wheels 901 fixedly provided on a plurality of the bucket wheel planet gear shafts 14 constitute a bucket wheel set 9; a third shaft 15 is fixedly provided in the middle of the bucket wheel sun gear 1001, the third shaft 15 penetrates through the first support frame 5 and the first shaft 3 whose inside is a hollow structure, and the third shaft 15 is rotatably connected to the first support frame 5; a planet gear shaft 12 is fixedly provided in the middle of the first planet gear 402, the planet gear shaft 12 passes through the first support frame 5, the hollow bucket wheel planet gear shaft 14 and the second support frame 8, the planet gear shaft 12 is rotatably connected to the first support frame 5 and the second support frame 8 respectively, and the planet gear shaft 12 passing through the first support frame 5, the hollow bucket wheel planet gear shaft 14 and the second support frame 8 is fixedly connected to the second planet gear 702.

In this embodiment, a third shaft 15 is fixedly provided in the middle of the bucket wheel sun gear 1001, the third shaft 15 penetrates through the first support frame 5 and the first shaft 3 whose inside is a hollow structure, and the third shaft 15 is rotatably connected to the first support frame 5; a planet gear shaft 12 is fixedly provided in the middle of the first planet gear 402, the planet gear shaft 12 passes through the first support frame 5, the hollow bucket wheel planet gear shaft 14 and the second support frame 8, the planet gear shaft 12 is rotatably connected to the first support frame 5 and the second support frame 8 respectively, and the planet gear shaft 12 passing through the first support frame 5, the hollow bucket wheel planet gear shaft 14 and the second support frame 8 is fixedly connected to the second planet gear 702. The outer housing 1, the first shaft 3, the second shaft 6 and the third shaft 15 can respectively four control ends. That is, among the four components of the outer housing 1, the first shaft 3, the second shaft 6 and the third shaft 15, one of them can be arbitrarily selected as the input end, another as the output end, and the other two as the control ends, alternatively, one of the other two is selected as the control end. Thus, various transmission needs can be flexibly handled and transmission applications in different fields can be satisfied. This continuously variable transmission has multiple functions and performance of satisfying different working conditions.

The operation process of the continuously variable transmission of this embodiment is as follows. When the continuously variable transmission starts, the set power is input clockwise from the first shaft 3 to drive the first sun gear 401 to rotate clockwise. The first sun gear 401 drives the first planet gear 402 to rotate counterclockwise, and drives the second planet gear 702 to rotate through the fixedly connected planet gear shaft 12. At this time, since the second sun gear 701 receives the load resistance from the second shaft 6, the second planet gear 702 revolves counterclockwise around the second sun gear 701. This revolution drives the first support frame 5, the second support frame 8, the third support frame 11 and the outer housing 1 to revolve counterclockwise as a whole. If a braking force is applied to the third shaft 15 to make the third shaft 15 not rotate, the bucket wheel sun gear 1001 does not rotate. The bucket wheel planet gear 1002 rotates counterclockwise around the bucket wheel sun gear 1001 under the drive of revolution, thereby driving the bucket wheel 901 to rotate counterclockwise. The rotating bucket wheel 901 is subjected to a resistance of the oil in the intermediate housing 101 to form a torque, and this resistance includes hydrodynamic gravity formed by the revolution of the intermediate housing 101, hydrodynamic force due to oil injection from the bucket wheel 901 to the adjacent bucket wheel 901, and hydrodynamic viscous force of oil between the bucket wheel 901 and the semicircular cavity on the inner wall of the outer housing 1. The resistance torque formed by the bucket wheel 901 are simultaneously transmitted to the first support frame 5, the second support frame 8 and the third support frame 11. The second planet gear 702 forms a torque that prevents the revolution caused by the resistance of the second shaft 6, thereby driving the second planet gear 702 to exert force on the second sun gear 701. The second sun gear 701 drives the second shaft 6 to output power. The resistance of the oil to the bucket wheel 901 starts at 0, and increases exponentially as the speed of the first shaft 3 increases. The second sun gear 701 drives the second shaft 6 to rotate, thereby outputting power through the second shaft 6.

In the above process of the continuously variable transmission, the continuously variable transmission is in the zero-speed and zero-torque start state at the initial stage of starting. At the middle stage of starting, the resistance to the bucket wheel set 9 increases rapidly, and the resistance finally acts on the first support frame 5, the second support frame 8 and the third support frame 11, and also acts on the intermediate housing 101. The input torque of the first shaft 3 acts on the second planet gear 702 through the first sun gear 401, the first planet gear 402 and the planet gear shaft 12, a part of the input torque is used for revolution torque, and a part of the input torque is used to overcome the resistance torque of the second shaft 6. The third shaft 15 is subjected to external braking force, which acts on the bucket wheel 901 through the bucket wheel sun gear 1001, the bucket wheel planet gear 1002 and the bucket wheel planet gear shaft 14. The resistance formed by the bucket wheel 901 prevents the outer housing 1 from revolving counterclockwise, and the power of rotation of the bucket wheel 901 is completely provided by an external force, which greatly improves the torque increasing function of the continuously variable transmission.

The resistance of the bucket wheel 901 is related to the speed. When the input end is in a low-speed state, the revolution speed is low, and the resistance provided by the bucket wheel 901 is insufficient, resulting in an unsatisfactory output torque. If braking control is performed on the outer housing 1 at this time, the counterclockwise revolution of the outer housing 1 is prevented, the dependence on the resistance provided by the bucket wheel 901 is reduced, and the output torque is increased. When the outer housing 1 is in half braking, the continuously variable transmission realizes the continuously variable speed function. When the outer housing 1 is in full braking, the continuously variable transmission realizes the reducer function.

When the continuously variable transmission is in the rated working condition, the speed and torque are relatively stable, and neither of braking ends applies brake. At this time, the bucket wheel 901 is in a force balance state and will not rotate, and the mutual gears do not rotate. The continuously variable transmission realizes synchronous transmission of power as a whole, which is close to 1:1 transmission.

In this Embodiment 1, the third shaft 15 fixed to the bucket wheel sun gear 1001 is guided to the outer end of the outer housing 1 by passing through the first shaft 3 with a hollow structure, so that the third shaft 15 becomes a control end. The outer housing 1, the first shaft 3, the second shaft 6 and the third shaft 15 form four control ends, which can flexibly set to select different components as the input end, the output end and the control end, greatly improves greatly the torque increasing and control function of the continuously variable transmission, and satisfies the requirements of multiple functions and different working conditions of the continuously variable transmission.

Figure 4:
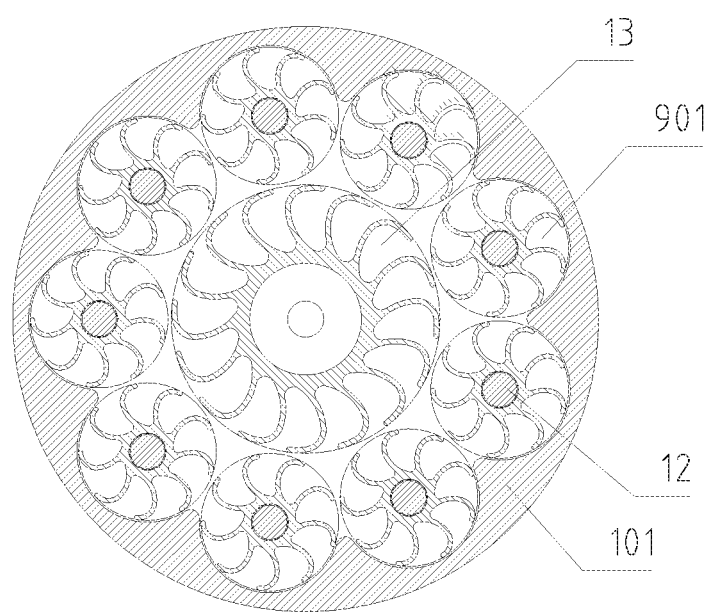
FIG. 4 is a section view of FIG. 3.
Figure 5:
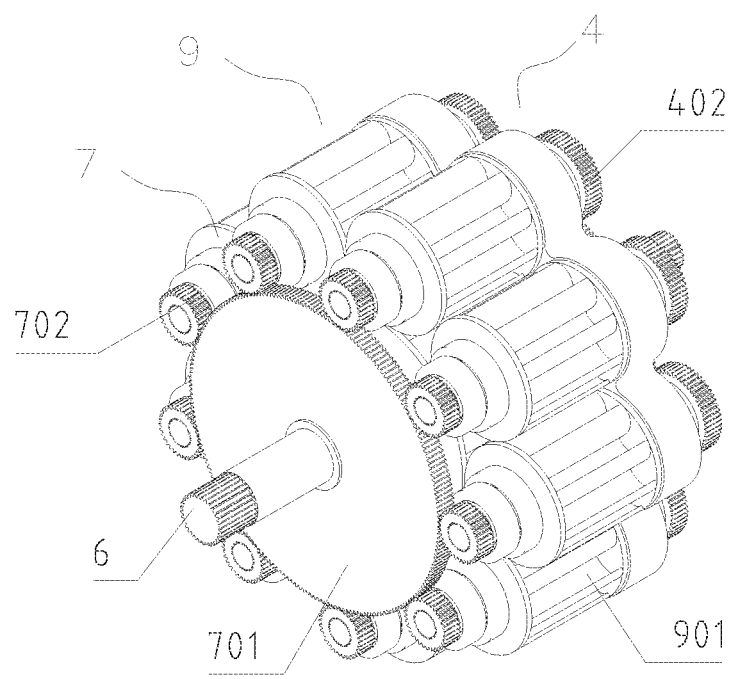
FIG. 5 is a structural schematic view after removing an outer housing.
Figure 6:
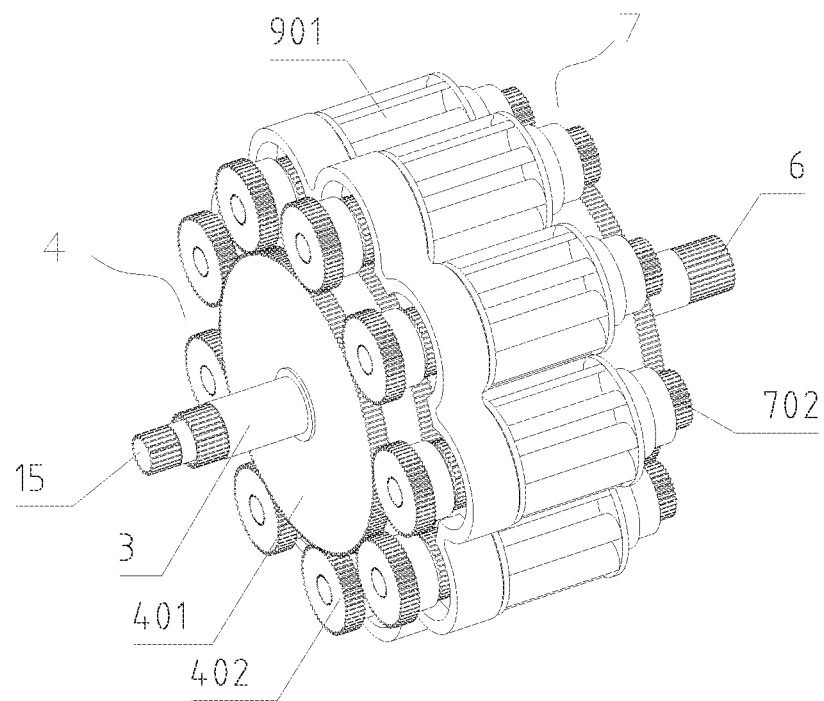
FIG. 6 is a structural schematic view in another direction after removing an outer housing.
Figure 7:
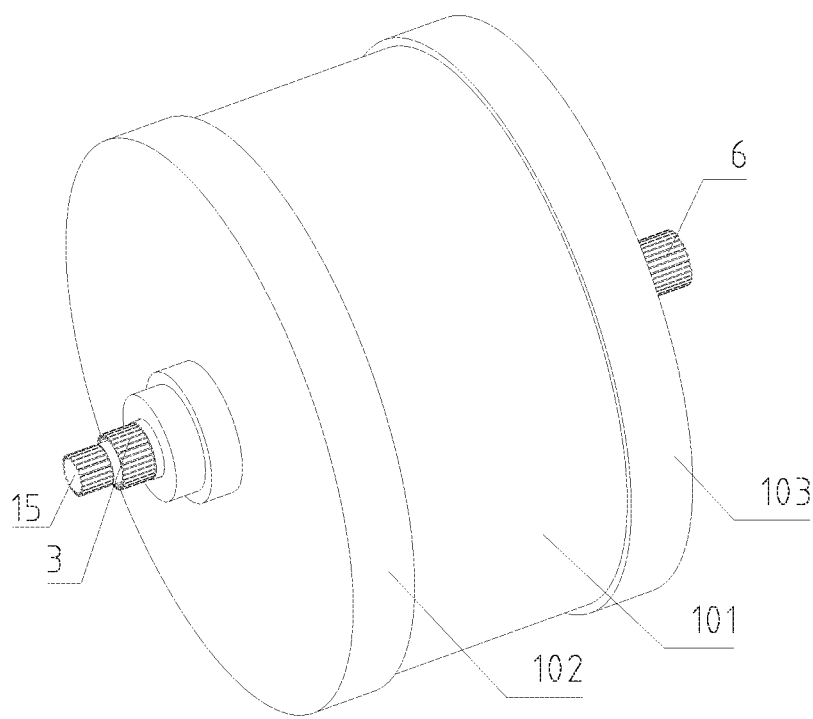
FIG. 7 is an axonometric view of Embodiment 2 of the present invention.
Figure 8:
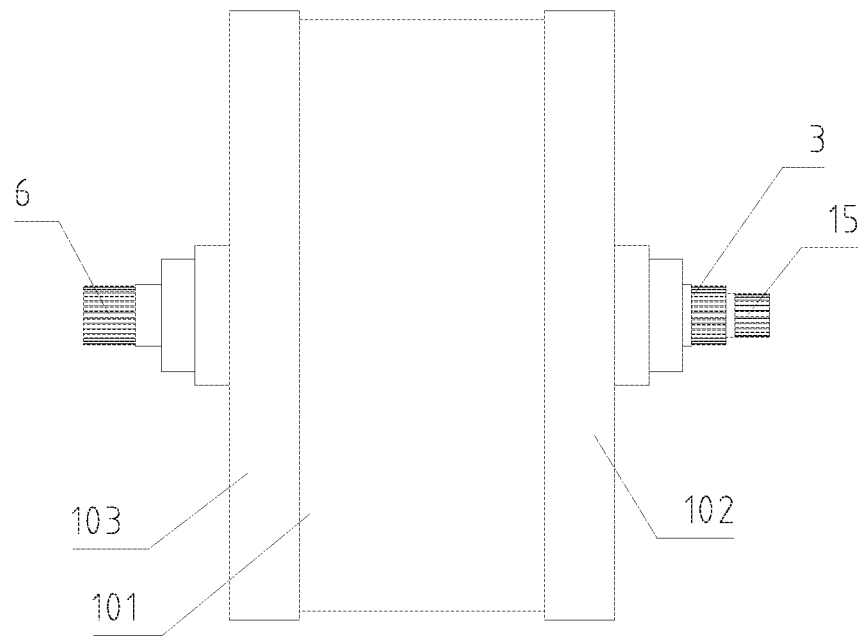
FIG. 8 is a front view of FIG. 7.

As can be seen in FIG. 4, a semicircular cavity is provided in a position corresponding to the bucket wheel 901 in an inner wall of the outer housing 1, and the bucket wheel 901 is located in the semicircular cavity. The bucket wheel 901 is located in the semicircular cavity in an inner wall of the outer housing 1, and the hydrodynamic force and the hydrodynamic viscous force of the bucket wheel 901 will exert more effective performance. The compact optimization of structure is achieved and the better performance is satisfied at the same time.

This series of continuously variable transmission may select 3 or more first planet gears 402 and second planet gears 702. In this embodiment, there are nine first planet gears 402 and nine second planet gears 702. Different numbers of the first planet gears 402 and the second planet gears 702 can be set according to transmitted power and used size, so as to adapt to different application requirements. Generally, different numbers can be selected, such as 6, 9, 12, and the like.

As can be seen in FIG. 4, a central bucket wheel 13 is fixedly provided on the second shaft 6 or the third shaft 15, and is located between the second support frame 8 and the third support frame 11. Providing the central bucket wheel 13 can adjust the operation mode of the oil in the inner cavity 2 and adjust the operation performance.

In the technical solution of the continuously variable transmission of this embodiment, since the operations of the bucket wheel sun gear 1001 and the first sun gear 401 are in a separate structure state, and the bucket wheel sun gear 1001 and the first sun gear 401 are not rigidly connected together, the bucket wheel set 9 and the first planet gear set 4 are also in a separate structure state and belong to two structures which independently operate. With this structure, when the first shaft 3 is used as the input end, the torque that provides the rotation of the bucket wheel all comes from the external force of the third shaft 15 and will not share the input torque of the first shaft 3 connected to the first planet gear set 4; when the second shaft 6 is used as the input end, the torque that provides the rotation of the bucket wheel 901 also comes from the third shaft 15 and will not aggravate the resistance torque that the first shaft 3 connected to the first planet gear set 4 needs to overcome. The transmission efficiency of the continuously variable transmission of this embodiment is high, the performance of the continuously variable transmission can be adjusted by controlling the bucket wheel 901, and the requirements of complex working conditions can be satisfied.

Embodiment 2

FIGS. 7-12 show Embodiment 2 of a continuously variable transmission of the present invention. The continuously variable transmission is provided with an outer housing 1, an intermediate housing 101 is provided in the middle of the outer housing 1, a first end cover 102 and a second end cover 103 are respectively provided on both sides of the intermediate housing 101, the inside of the intermediate housing 101 is a cavity structure, and the cavity inside the intermediate housing 101 and insides of the first end cover 102 and the second end cover 103 form an inner cavity 2; a first shaft 3 penetrates in the middle of the first end cover 102, the inside of the first shaft 3 is a hollow structure, the first shaft 3 is rotatably connected to the first end cover 102, a first gear ring 401A is fixedly provided on the first shaft 3, the first gear ring 401A is located inside the first end cover 102, the first gear ring 401A is adjacently provided with a first support frame 5, a first planet gear 402 is provided inside an outer circumference of the first gear ring 401A, the first planet gear 402 is engaged with the first gear ring 401A, and the first planet gear 402 and the first gear ring 401A constitute a first planet gear set 4; a second shaft 6 penetrates in the middle of the second end cover 103, the second shaft 6 is rotatably connected to the second end cover 103, a second gear ring 701A is fixedly provided on the second shaft 6, the second gear ring 701A is located inside the second end cover 103, the second gear ring 701A is adjacently provided with a second support frame 8, a second planet gear 702 is provided inside an outer circumference of the second gear ring 701A, the second planet gear 702 is engaged with the second gear ring 701A, and the second planet gear 702 and the second gear ring 701A constitute a second planet gear set 7; a bucket wheel sun gear 1001 is provided inside the first support frame 5, a third support frame 11 is adjacently provided inside the bucket wheel sun gear 1001, a bucket wheel planet gear 1002 is provided on an outer circumference of the bucket wheel sun gear 1001, the bucket wheel planet gear 1002 is engaged with the bucket wheel sun gear 1001, and the bucket wheel planet gear 1002 and the bucket wheel sun gear 1001 constitute a bucket wheel planet gear set 10; a bucket wheel planet gear shaft 14 is fixedly provided in the middle of the bucket wheel planet gear 1002, the inside of the bucket wheel planet gear shaft 14 is a hollow structure, the bucket wheel planet gear shaft 14 passes through the third support frame 11, the bucket wheel planet gear shaft 14 is rotatably connected to the third support frame 11, a bucket wheel 901 is fixedly provided on the bucket wheel planet gear shaft 14 passing through the third support frame 11, the bucket wheel 901 is located between the second support frame 8 and the third support frame 11, and the bucket wheels 901 fixedly provided on a plurality of the bucket wheel planet gear shafts 14 constitute a bucket wheel set 9; a third shaft 15 is fixedly provided in the middle of the bucket wheel sun gear 1001, the third shaft 15 penetrates through the first support frame 5 and the first shaft 3 whose inside is a hollow structure, and the third shaft 15 is rotatably connected to the first support frame 5; a planet gear shaft 12 is fixedly provided in the middle of the first planet gear 402, the planet gear shaft 12 passes through the first support frame 5, the hollow bucket wheel planet gear shaft 14 and the second support frame 8, the planet gear shaft 12 is rotatably connected to the first support frame 5 and the second support frame 8 respectively, and the planet gear shaft 12 passing through the first support frame 5, the hollow bucket wheel planet gear shaft 14 and the second support frame 8 is fixedly connected to the second planet gear 702.

Figure 9:
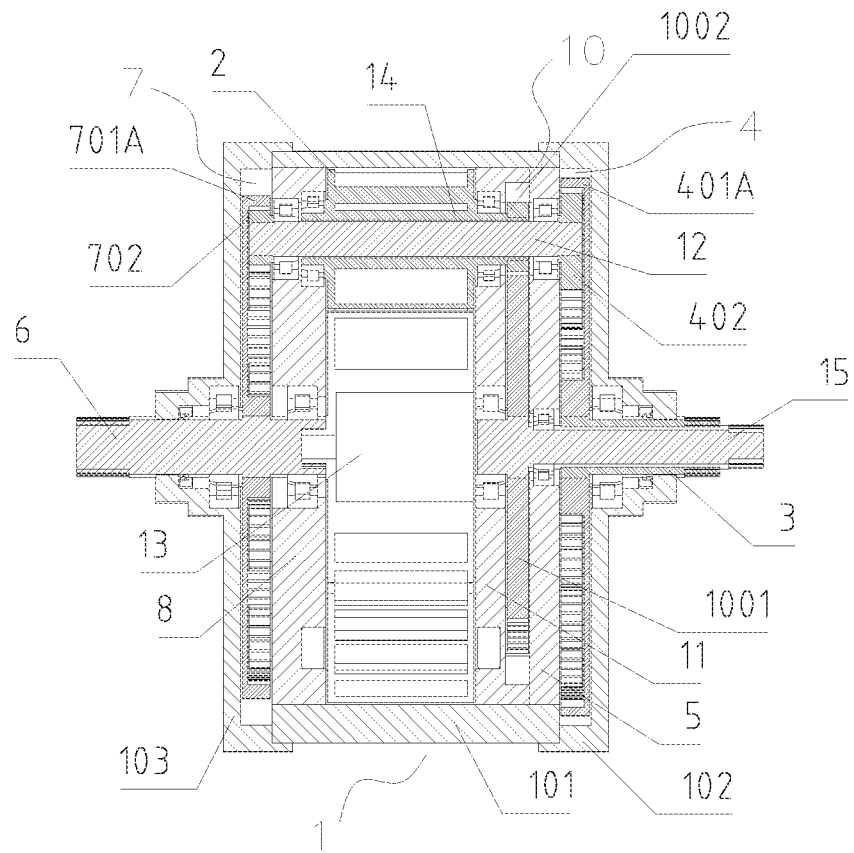
FIG. 9 is a section view of FIG. 8.

As can be seen in FIG. 9, the differences from Embodiment 1 are in that the first sun gear 401 in Embodiment 1 is replaced with the first gear ring 401A in this embodiment, and the second sun gear 701 in Embodiment 1 is replaced with the second gear ring 701A in this embodiment. When the power is input from the first shaft 3 or the second shaft 6, since the outer diameters of the first gear ring 401A and the second gear ring 701A are larger than those of the first sun gear 401 and the second sun gear 701, the transmitted torque is large, and the efficiency of engagement transmission between the gear ring and the planet gear is higher than that between the sun gear and the planet gear, which can well improve the power transmission performance of the continuously variable transmission, and is more suitable for field applications that need to transmit greater power and torque.

It has been verified by test that, this embodiment increases the torque transmission capacity by about 40%, while reducing the damage of centrifugal force of the first planet gear 402 and the second planet gear 702 during operation. At the same time, the lubrication performance is better, and the application of different working conditions of the continuously variable transmission can be satisfied.

Embodiment 3

With reference to FIGS. 3, 6, 9 and 12, Embodiment 3 of the present invention can be formed. A continuously variable transmission is provided with an outer housing 1, an intermediate housing 101 is provided in the middle of the outer housing 1, a first end cover 102 and a second end cover 103 are respectively provided on both sides of the intermediate housing 101, the inside of the intermediate housing 101 is a cavity structure, and the cavity inside the intermediate housing 101 and insides of the first end cover 102 and the second end cover 103 form an inner cavity 2; a first shaft 3 penetrates in the middle of the first end cover 102, the inside of the first shaft 3 is a hollow structure, the first shaft 3 is rotatably connected to the first end cover 102, a first sun gear 401 is fixedly provided on the first shaft 3, the first sun gear 401 is located inside the first end cover 102, the first sun gear 401 is adjacently provided with a first support frame 5, a first planet gear 402 is provided on an outer circumference of the first sun gear 401, the first planet gear 402 is engaged with the first sun gear 401, and the first planet gear 402 and the first sun gear 401 constitute a first planet gear set 4; a second shaft 6 penetrates in the middle of the second end cover 103, the second shaft 6 is rotatably connected to the second end cover 103, a second gear ring 701A is fixedly provided on the second shaft 6, the second gear ring 701A is located inside the second end cover 103, the second gear ring 701A is adjacently provided with a second support frame 8, a second planet gear 702 is provided inside an outer circumference of the second gear ring 701A, the second planet gear 702 is engaged with the second gear ring 701A, and the second planet gear 702 and the second gear ring 701A constitute a second planet gear set 7; a bucket wheel sun gear 1001 is provided inside the first support frame 5, a third support frame 11 is adjacently provided inside the bucket wheel sun gear 1001, a bucket wheel planet gear 1002 is provided on an outer circumference of the bucket wheel sun gear 1001, the bucket wheel planet gear 1002 is engaged with the bucket wheel sun gear 1001, and the bucket wheel planet gear 1002 and the bucket wheel sun gear 1001 constitute a bucket wheel planet gear set 10; a bucket wheel planet gear shaft 14 is fixedly provided in the middle of the bucket wheel planet gear 1002, the inside of the bucket wheel planet gear shaft 14 is a hollow structure, the bucket wheel planet gear shaft 14 passes through the third support frame 11, the bucket wheel planet gear shaft 14 is rotatably connected to the third support frame 11, a bucket wheel 901 is fixedly provided on the bucket wheel planet gear shaft 14 passing through the third support frame 11, the bucket wheel 901 is located between the second support frame 8 and the third support frame 11, and the bucket wheels 901 fixedly provided on a plurality of the bucket wheel planet gear shafts 14 constitute a bucket wheel set 9; a third shaft 15 is fixedly provided in the middle of the bucket wheel sun gear 1001, the third shaft 15 penetrates through the first support frame 5 and the first shaft 3 whose inside is a hollow structure, and the third shaft 15 is rotatably connected to the first support frame 5; a planet gear shaft 12 is fixedly provided in the middle of the first planet gear 402, the planet gear shaft 12 passes through the first support frame 5, the hollow bucket wheel planet gear shaft 14 and the second support frame 8, the planet gear shaft 12 is rotatably connected to the first support frame 5 and the second support frame 8 respectively, and the planet gear shaft 12 passing through the first support frame 5, the hollow bucket wheel planet gear shaft 14 and the second support frame 8 is fixedly connected to the second planet gear 702.

Embodiment 4

With reference to FIGS. 3, 6, 9 and 12, Embodiment 4 of the present invention can be formed. A continuously variable transmission is provided with an outer housing 1, an intermediate housing 101 is provided in the middle of the outer housing 1, a first end cover 102 and a second end cover 103 are respectively provided on both sides of the intermediate housing 101, the inside of the intermediate housing 101 is a cavity structure, and the cavity inside the intermediate housing 101 and insides of the first end cover 102 and the second end cover 103 form an inner cavity 2; a first shaft 3 penetrates in the middle of the first end cover 102, the inside of the first shaft 3 is a hollow structure, the first shaft 3 is rotatably connected to the first end cover 102, a first gear ring 401A is fixedly provided on the first shaft 3, the first gear ring 401A is located inside the first end cover 102, the first gear ring 401A is adjacently provided with a first support frame 5, a first planet gear 402 is provided inside an outer circumference of the first gear ring 401A, the first planet gear 402 is engaged with the first gear ring 401A, and the first planet gear 402 and the first gear ring 401A constitute a first planet gear set 4; a second shaft 6 penetrates in the middle of the second end cover 103, the second shaft 6 is rotatably connected to the second end cover 103, a second sun gear 701 is fixedly provided on the second shaft 6, the second sun gear 701 is located inside the second end cover 103, the second sun gear 701 is adjacently provided with a second support frame 8, a second planet gear 702 is provided on an outer circumference of the second sun gear 701, the second planet gear 702 is engaged with the second sun gear 701, and the second planet gear 702 and the second sun gear 701 constitute a second planet gear set 7; a bucket wheel sun gear 1001 is provided inside the first support frame 5, a third support frame 11 is adjacently provided inside the bucket wheel sun gear 1001, a bucket wheel planet gear 1002 is provided on an outer circumference of the bucket wheel sun gear 1001, the bucket wheel planet gear 1002 is engaged with the bucket wheel sun gear 1001, and the bucket wheel planet gear 1002 and the bucket wheel sun gear 1001 constitute a bucket wheel planet gear set 10; a bucket wheel planet gear shaft 14 is fixedly provided in the middle of the bucket wheel planet gear 1002, the inside of the bucket wheel planet gear shaft 14 is a hollow structure, the bucket wheel planet gear shaft 14 passes through the third support frame 11, the bucket wheel planet gear shaft 14 is rotatably connected to the third support frame 11, a bucket wheel 901 is fixedly provided on the bucket wheel planet gear shaft 14 passing through the third support frame 11, the bucket wheel 901 is located between the second support frame 8 and the third support frame 11, and the bucket wheels 901 fixedly provided on a plurality of the bucket wheel planet gear shafts 14 constitute a bucket wheel set 9; a third shaft 15 is fixedly provided in the middle of the bucket wheel sun gear 1001, the third shaft 15 penetrates through the first support frame 5 and the first shaft 3 whose inside is a hollow structure, and the third shaft 15 is rotatably connected to the first support frame 5; a planet gear shaft 12 is fixedly provided in the middle of the first planet gear 402, the planet gear shaft 12 passes through the first support frame 5, the hollow bucket wheel planet gear shaft 14 and the second support frame 8, the planet gear shaft 12 is rotatably connected to the first support frame 5 and the second support frame 8 respectively, and the planet gear shaft 12 passing through the first support frame 5, the hollow bucket wheel planet gear shaft 14 and the second support frame 8 is fixedly connected to the second planet gear 702.

Figure 10:
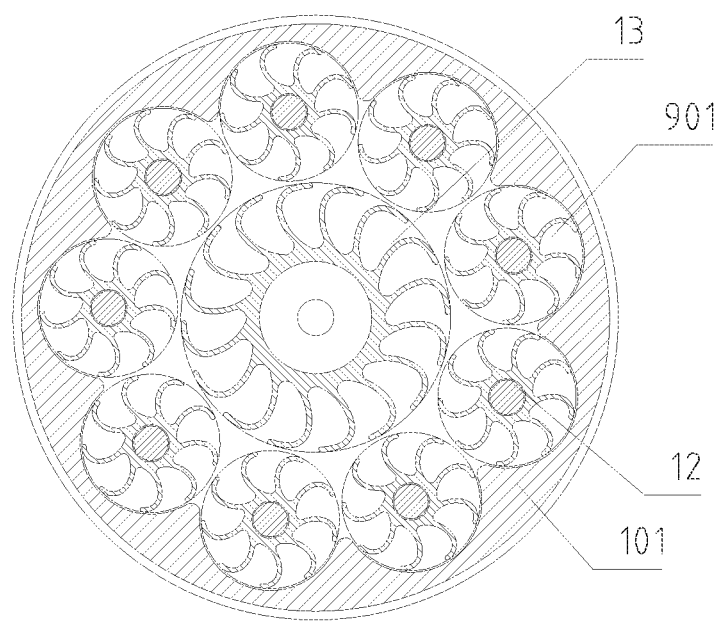
FIG. 10 is a section view of FIG. 8.
Figure 11:
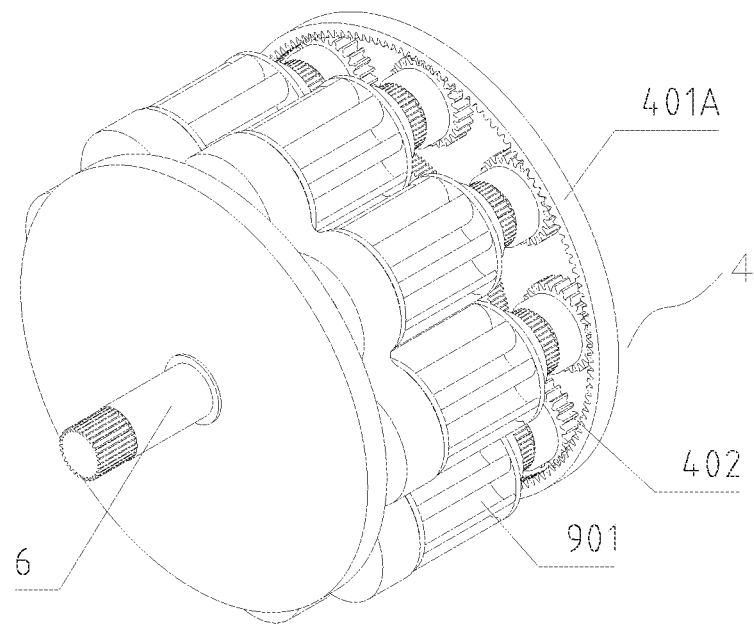
FIG. 11 is a structural schematic view after removing an outer housing.
Figure 12:
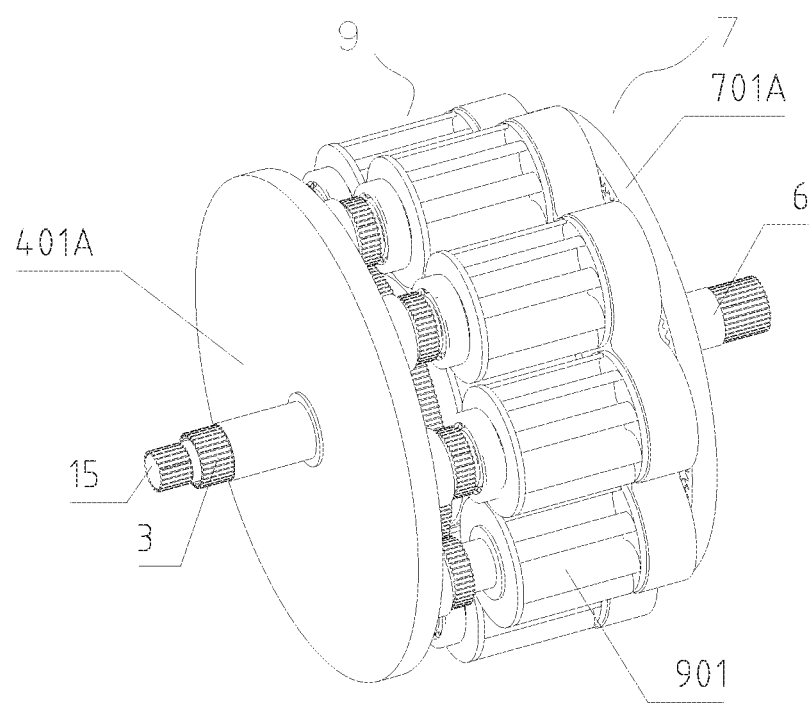
FIG. 12 is a structural schematic view in another direction after removing an outer housing.

As can be seen in FIG. 10, a semicircular cavity is provided in a position corresponding to the bucket wheel in an inner wall of the outer housing 1, and the bucket wheel 901 is located in the semicircular cavity.

The differences between Embodiments 3, 4 and Embodiments 1, 2 are in that, the first sun gear 401 or the second sun gear 701 corresponding to one end of the first shaft 3 or one end of the second shaft 6 can be replaced with the first gear ring 401A or the second gear ring 701A. The benefits of such design are in that, different transmission ratios can be flexibly set, so as to satisfy power transmission requirements of various different occasions.

The above are only the specific embodiments of the present invention, and the scope of the present invention is not limited thereto, and thus all of the replacement of the equivalent components thereof, or the equivalent changes and modifications made according to the claimed scope of the present invention should still fall within the scope encompassed by the claims of the present invention.

What is claimed is:

1. A continuously variable transmission provided with an outer housing, characterized in that, an intermediate housing is provided in the middle of the outer housing, a first end cover and a second end cover are respectively provided on both sides of the intermediate housing, the inside of the intermediate housing is a cavity structure, and the cavity inside the intermediate housing and insides of the first end cover and the second end cover form an inner cavity;

a first shaft penetrates in the middle of the first end cover, the inside of the first shaft is a hollow structure, the first shaft is rotatably connected to the first end cover, a first sun gear is fixedly provided on the first shaft, the first sun gear is located adjacent the first end cover, the first sun gear is adjacently provided with a first support frame, a first planet gear is provided on an outer circumference of the first sun gear, the first planet gear is engaged with the first sun gear, and the first planet gear and the first sun gear constitute a first planet gear set;

a second shaft penetrates in the middle of the second end cover, the second shaft is rotatably connected to the second end cover, a second sun gear is fixedly provided on the second shaft, the second sun gear is located adjacent the second end cover, the second sun gear is adjacently provided with a second support frame, a second planet gear is provided on an outer circumference of the second sun gear, the second planet gear is engaged with the second sun gear, and the second planet gear and the second sun gear constitute a second planet gear set;

a bucket wheel sun gear is provided adjacent the first support frame, a third support frame is adjacently provided inside the bucket wheel sun gear, a bucket wheel planet gear is provided on an outer circumference of the bucket wheel sun gear, the bucket wheel planet gear is engaged with the bucket wheel sun gear, and the bucket wheel planet gear and the bucket wheel sun gear constitute a bucket wheel planet gear set;

a bucket wheel planet gear shaft is fixedly provided in the middle of the bucket wheel planet gear, the inside of the bucket wheel planet gear shaft is a hollow structure, the bucket wheel planet gear shaft passes through the third support frame, the bucket wheel planet gear shaft is rotatably connected to the third support frame, a bucket wheel is fixedly provided on the bucket wheel planet gear shaft passing through the third support frame, the bucket wheel is located between the second support frame and the third support frame;

a third shaft is fixedly provided in the middle of the bucket wheel sun gear, the third shaft penetrates through the first support frame and the first shaft whose inside is a hollow structure, and the third shaft is rotatably connected to the first support frame; and a planet gear shaft is fixedly provided in the middle of the first planet gear, the planet gear shaft passes through the first support frame, the hollow bucket wheel planet gear shaft and the second support frame, the planet gear shaft is rotatably connected to the first support frame and the second support frame respectively, and the planet gear shaft passing through the first support frame, the hollow bucket wheel planet gear shaft and the second support frame is fixedly connected to the second planet gear.

2. The continuously variable transmission according to claim 1, characterized in that, a semicircular cavity is provided in a position corresponding to the bucket wheel on the bucket wheel planet gear shaft in an inner wall of the outer housing, and the bucket wheel is located in the semicircular cavity.

3. The continuously variable transmission according to claim 1, characterized in that, the first planet gear is one of three or more first planet gears.

4. The continuously variable transmission according to claim 1, characterized in that, the second planet gear is one of three or more second planet gears.

5. The continuously variable transmission according to claim 1, characterized in that, a central bucket wheel is fixedly provided on the second shaft or the third shaft.

6. A continuously variable transmission provided with an outer housing, characterized in that, an intermediate housing is provided in the middle of the outer housing, a first end cover and a second end cover are respectively provided on both sides of the intermediate housing, the inside of the intermediate housing is a cavity structure, and the cavity inside the intermediate housing and insides of the first end cover and the second end cover form an inner cavity;

a first shaft penetrates in the middle of the first end cover, the inside of the first shaft is a hollow structure, the first shaft is rotatably connected to the first end cover, a first gear ring is fixedly provided on the first shaft, the first gear ring is located adjacent the first end cover, the first gear ring is adjacently provided with a first support frame, a first planet gear is provided inside an outer circumference of the first gear ring, the first planet gear is engaged with the first gear ring, and the first planet gear and the first gear ring constitute a first planet gear set;

a second shaft penetrates in the middle of the second end cover, the second shaft is rotatably connected to the second end cover, a second gear ring is fixedly provided on the second shaft, the second gear ring is located adjacent the second end cover, the second gear ring is adjacently provided with a second support frame, a second planet gear is provided inside an outer circumference of the second gear ring, the second planet gear is engaged with the second gear ring, and the second planet gear and the second gear ring constitute a second planet gear set;

a bucket wheel sun gear is provided adjacent the first support frame, a third support frame is adjacently provided inside the bucket wheel sun gear, a bucket wheel planet gear is provided on an outer circumference of the bucket wheel sun gear, the bucket wheel planet gear is engaged with the bucket wheel sun gear, and the bucket wheel planet gear and the bucket wheel sun gear constitute a bucket wheel planet gear set;

a bucket wheel planet gear shaft is fixedly provided in the middle of the bucket wheel planet gear, the inside of the bucket wheel planet gear shaft is a hollow structure, the bucket wheel planet gear shaft passes through the third support frame, the bucket wheel planet gear shaft is rotatably connected to the third support frame, a bucket wheel is fixedly provided on the bucket wheel planet gear shaft passing through the third support frame, the bucket wheel is located between the second support frame and the third support frame;

a third shaft is fixedly provided in the middle of the bucket wheel sun gear, the third shaft penetrates through the first support frame and the first shaft whose inside is a hollow structure, and the third shaft is rotatably connected to the first support frame; and a planet gear shaft is fixedly provided in the middle of the first planet gear, the planet gear shaft passes through the first support frame, the hollow bucket wheel planet gear shaft and the second support frame, the planet gear shaft is rotatably connected to the first support frame and the second support frame respectively, and the planet gear shaft passing through the first support frame, the hollow bucket wheel planet gear shaft and the second support frame is fixedly connected to the second planet gear.

7. A continuously variable transmission provided with an outer housing, characterized in that, an intermediate housing is provided in the middle of the outer housing, a first end cover and a second end cover are respectively provided on both sides of the intermediate housing, the inside of the intermediate housing is a cavity structure, and the cavity inside the intermediate housing and insides of the first end cover and the second end cover form an inner cavity;

a first shaft penetrates in the middle of the first end cover, the inside of the first shaft is a hollow structure, the first shaft is rotatably connected to the first end cover, a first sun gear is fixedly provided on the first shaft, the first sun gear is located adjacent the first end cover, the first sun gear is adjacently provided with a first support frame, a first planet gear is provided on an outer circumference of the first sun gear, the first planet gear is engaged with the first sun gear, and the first planet gear and the first sun gear constitute a first planet gear set;

a second shaft penetrates in the middle of the second end cover, the second shaft is rotatably connected to the second end cover, a second gear ring is fixedly provided on the second shaft, the second gear ring is located adjacent the second end cover, the second gear ring is adjacently provided with a second support frame, a second planet gear is provided inside an outer circumference of the second gear ring, the second planet gear is engaged with the second gear ring, and the second planet gear and the second gear ring constitute a second planet gear set;

a bucket wheel sun gear is provided adjacent the first support frame, a third support frame is adjacently provided inside the bucket wheel sun gear, a bucket wheel planet gear is provided on an outer circumference of the bucket wheel sun gear, the bucket wheel planet gear is engaged with the bucket wheel sun gear, and the bucket wheel planet gear and the bucket wheel sun gear constitute a bucket wheel planet gear set;

a bucket wheel planet gear shaft is fixedly provided in the middle of the bucket wheel planet gear, the inside of the bucket wheel planet gear shaft is a hollow structure, the bucket wheel planet gear shaft passes through the third support frame, the bucket wheel planet gear shaft is rotatably connected to the third support frame, a bucket wheel is fixedly provided on the bucket wheel planet gear shaft passing through the third support frame, the bucket wheel is located between the second support frame and the third support frame;

a third shaft is fixedly provided in the middle of the bucket wheel sun gear, the third shaft penetrates through the first support frame and the first shaft whose inside is a hollow structure, and the third shaft is rotatably connected to the first support frame; and a planet gear shaft is fixedly provided in the middle of the first planet gear, the planet gear shaft passes through the first support frame, the hollow bucket wheel planet gear shaft and the second support frame, the planet gear shaft is rotatably connected to the first support frame and the second support frame respectively, and the planet gear shaft passing through the first support frame, the hollow bucket wheel planet gear shaft and the second support frame is fixedly connected to the second planet gear.

8. The continuously variable transmission according to claim 6, characterized in that, a semicircular cavity is provided in a position corresponding to the bucket wheel on the bucket wheel planet gear shaft in an inner wall of the outer housing, and the bucket wheel is located in the semicircular cavity.

* * * * *